June 26, 1934.  H. PERROT  1,964,531

SERVO MECHANISM

Filed Jan. 21, 1929  2 Sheets-Sheet 1

INVENTOR.
Henri Perrot
BY M. W. McConkey
ATTORNEY

June 26, 1934.  H. PERROT  1,964,531

SERVO MECHANISM

Filed Jan. 21, 1929   2 Sheets-Sheet 2

INVENTOR.
Henri Perrot
BY M. W. McConkey
ATTORNEY

Patented June 26, 1934

1,964,531

UNITED STATES PATENT OFFICE 1,964,531

SERVO MECHANISM

Henri Perrot, Paris, France, assignor, by mesne assignments, to Bendix Aviation Corporation, New York, N. Y., a corporation of Delaware Application January 21, 1929, Serial No. 333,807

1 Claim. (Cl. 188—140)

This invention relates to operating mechanism for brakes or the like, and is illustrated as embodied in a novel and compact servo mechanism arranged between the transmission and the propeller shaft of an automobile. Various features of novelty relate to the arrangement of a novel housing for the mechanism adapted to be secured to the rear of an ordinary automobile transmission; to the improved mechanism through which the servo operates; to a simplified electrically-controlled magnetic means for operating the servo; to a novel embodiment including a simple speedometer drive; and to other novel and desirable features and constructions which will be apparent from the following description of one illustrative embodiment shown in the accompanying drawings, in which:

Figure 1:
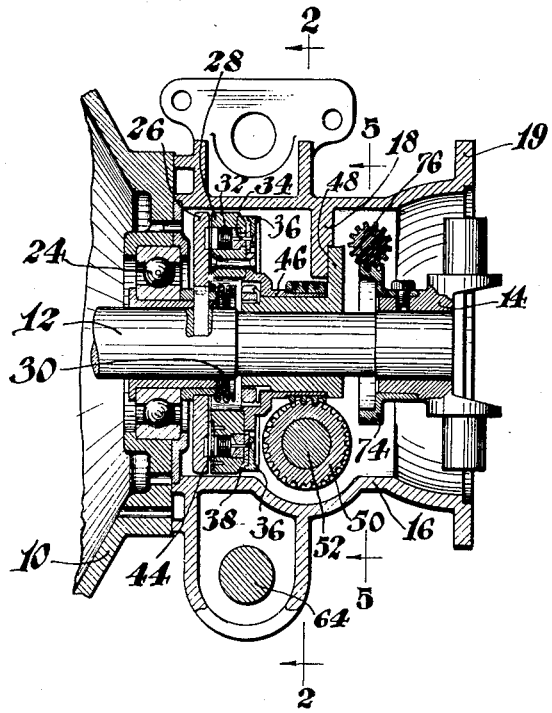
Figure 1 is a vertical section longitudinally through the mechanism, with part of the transmission and with the propeller shaft connection shown.

The transmission housing is shown at 10, and may inclose any ordinary change-speed gearing driving a driven shaft 12 extending through the rear end of the housing and provided at its end with a fitting 14 forming part of a universal joint driving the usual propeller shaft (not shown). The fitting 14 is fixedly secured in any desired manner to the driven shaft 12.

At the rear of the transmission housing 10 is arranged an adapter housing 16, preferably divided by a partition 18 into front and rear compartments. Housing 16 is bolted to the rear end of housing 10, and is in turn formed at its rear end with a flange 19 to which is bolted the usual spherical housing 20 for the universal joint and for the front end of the torque tube 22 if one is used.

Within the front compartment of the adapter housing 16, immediately behind the usual anti-friction bearing 24 for shaft 12, is arranged a novel servo device which preferably includes as an operating member a friction or clutch disk 26 keyed or otherwise secured to the shaft 12 and rotating with the shaft. Immediately adjacent disk 26, and at the rear thereof, is a co-operating clutch disk or friction servo member 28 loose on shaft 12 and movable axially of the shaft against the resistance of a spring 30 into frictional engagement with disk 26.

The servo disk 28 is preferably of iron or other magnetic material, and is provided with a coil or coils 32 of wire, forming with the disk an electro-magnet which is clutched yieldingly against disk 26 when the current is passed through the coil 32. One end of the wire of coil 32 is grounded by being connected to disk 28, and the other end is connected at 34 to a slip ring 36 mounted by means of insulating material 38 on the disk 28.

The slip ring 36 is engaged by a brush 40 extending through the casing or housing 16, and having on the outside of the casing a binding post 42 for connecting a wire from a suitable switch (not shown) mounted on the brake pedal and connected to the battery. Thus the depression of the brake pedal causes the current to flow through the coil 32, thus clutching the disk 28 frictionally to the disk 26, so that it tends to turn with the disk 26. A plate 44 may be secured over the coil 32.

Disk 28 is formed with a central hub slidably keyed to a pinion or worm gear 46 rotatably mounted on a fixed sleeve 48 having an end flange bolted to the partition 18. The pinion or gear 46 meshes with a corresponding pinion or gear 50 sidable axially on a transverse shaft 52 journaled in the housing 16, and formed at its ends with clutch teeth for interlocking engagement with one or the other of two clutch members 54 and 56 pinned or otherwise secured to shaft 52. Pinion or gear 50 is shifted endwise under load to be clutched to shaft 52, by the thrust of the inter-engaging teeth of pinion or gear 46.

At one end of shaft 52 is secured an arm 58, connected by a compression link 60 to an arm 62 on a shaft 64 paralleling shaft 52 and journaled in the housing 16. Shaft 64 also has an arm 66, which may be an integral extension of arm 62, having a part such as an adjustable setscrew 68 engaging an arm 70 forming part of the brake-operating mechanism, thus causing arm 62 to have an over-running connection with the usual brake-operating mechanism, so that it adds the power of the servo mechanism to the power exerted by the driver, without interfering with the independent manual operation of the brakes.

Link 60 is connected to the free end of arm 58, and extends substantially parallel to arm 58 and substantially perpendicular to arm 62, at least when the servo mechanism is in idle or brake-released position. Thus arm 58 can swing in either direction, according to which way the propeller shaft is turning and still turn arm 62 in the same direction.

In the rear compartment of the housing 16, the fitting 14 is provided with a worm or gear 74, meshing with a gear 76 keyed to a shaft 78 journaled in a bushing 80 carried by housing 16, the whole forming a speedometer drive.

Figure 2:
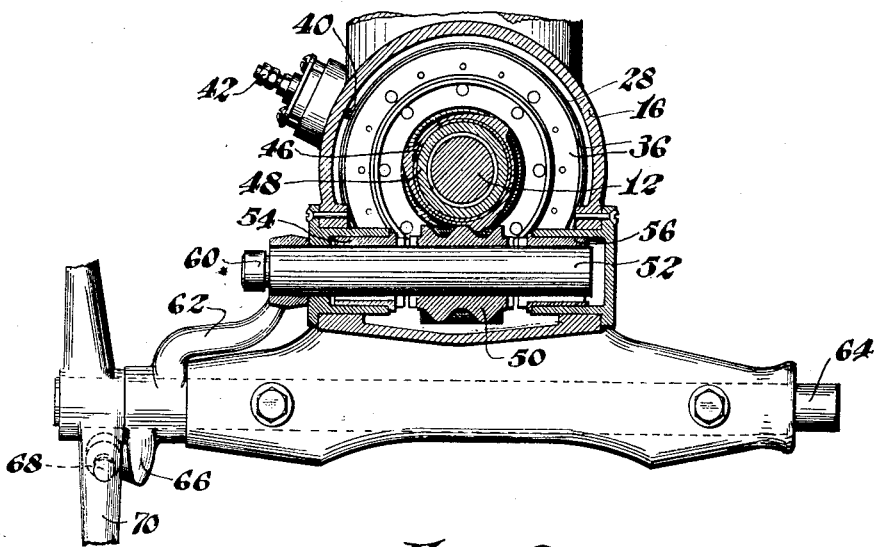
Figure 2 is a section on the line 2—2 of Figure 1, showing the shaft arrangement.
Figure 3:
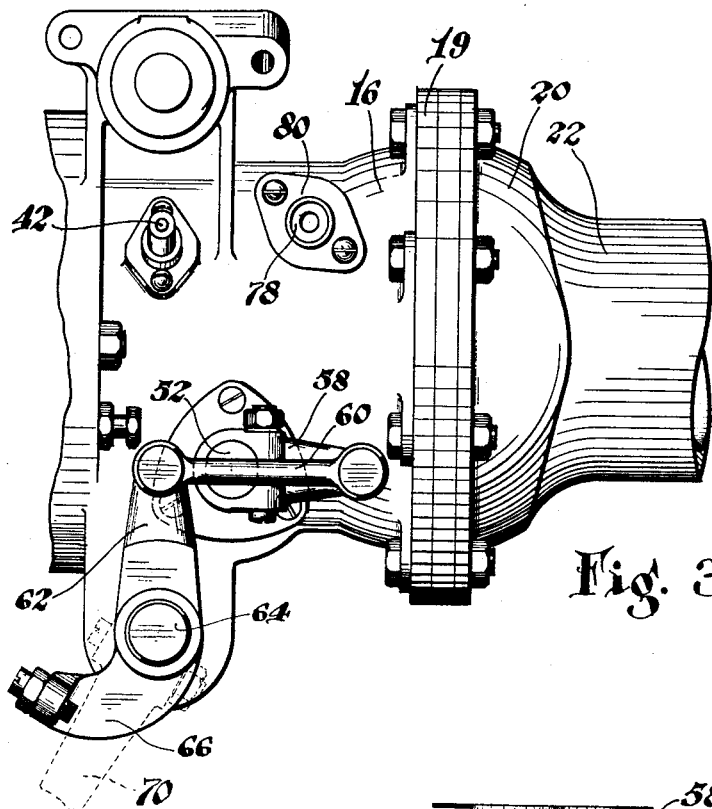
Figure 3 is a side elevation of the mechanism.
Figure 4:
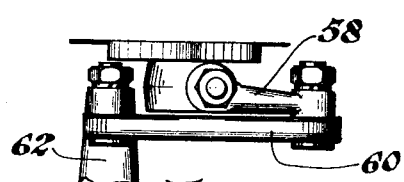
Figure 4 is a top plan view of the connection between the shafts.
Figure 5:
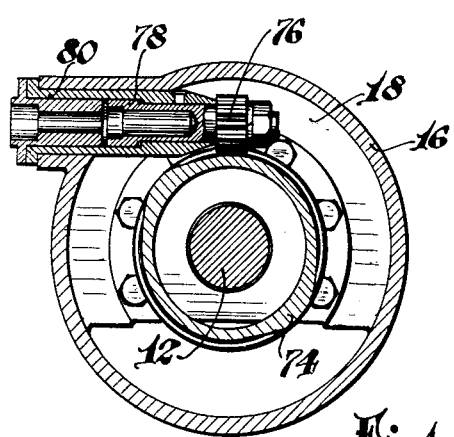
Figure 5 is a section on the line 5—5 of Figure 1, showing the speedometer drive.

While one illustrative embodiment has been described in detail, it is not my intention to limit the scope of the invention to that particular embodiment, or otherwise than by the terms of the appended claim. It is not my intention to claim in the present application the subject-matter of Figure 2 of my application No. 230,091, filed October 31, 1927, (Patent No. 1,827,104) or of my divisional application No. 320,266, filed December 14, 1928, (Patent No. 1,856,424) thereon.

I claim:

Brake operating mechanism comprising, in combination, power means, a shaft adapted to be coupled with said power means to rotate in either direction, a brake rock shaft parallel to said first mentioned shaft, a member freely rotatable on said brake shaft adapted upon rotation in one direction to engage and rock the brake shaft, and connecting linkage between said first mentioned shaft and said member adapted upon rotation of the shaft in either of its directions to rotate the member in only one direction to thereby rock said brake shaft.

HENRI PERROT.